April 26, 1949.    L. A. HERZIG ET AL    2,468,629
METHOD AND APPARATUS FOR SPLICING FILMS
Filed Nov. 14, 1945    2 Sheets-Sheet 1
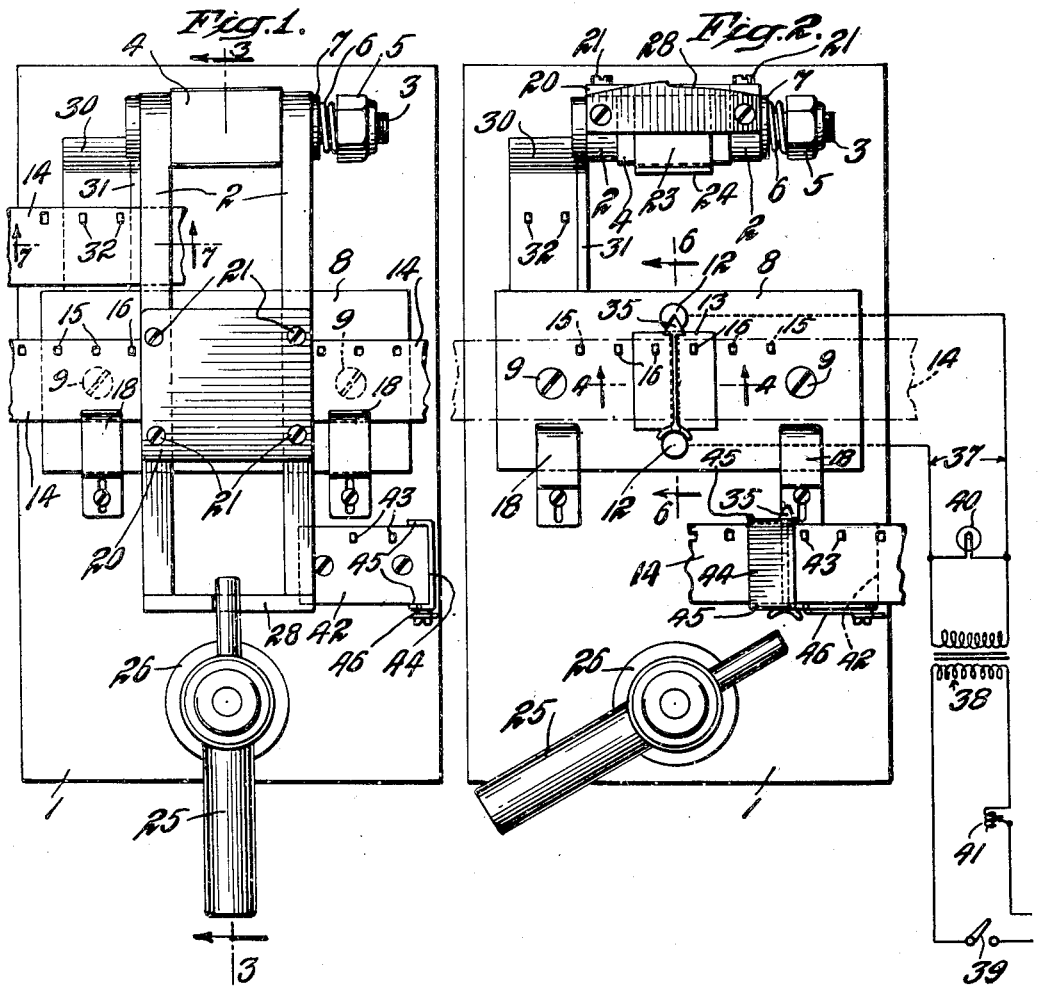
INVENTORS
LEONARD A. HERZIG
MARTIN COAN
BY
D. Malcolm
ATTORNEY

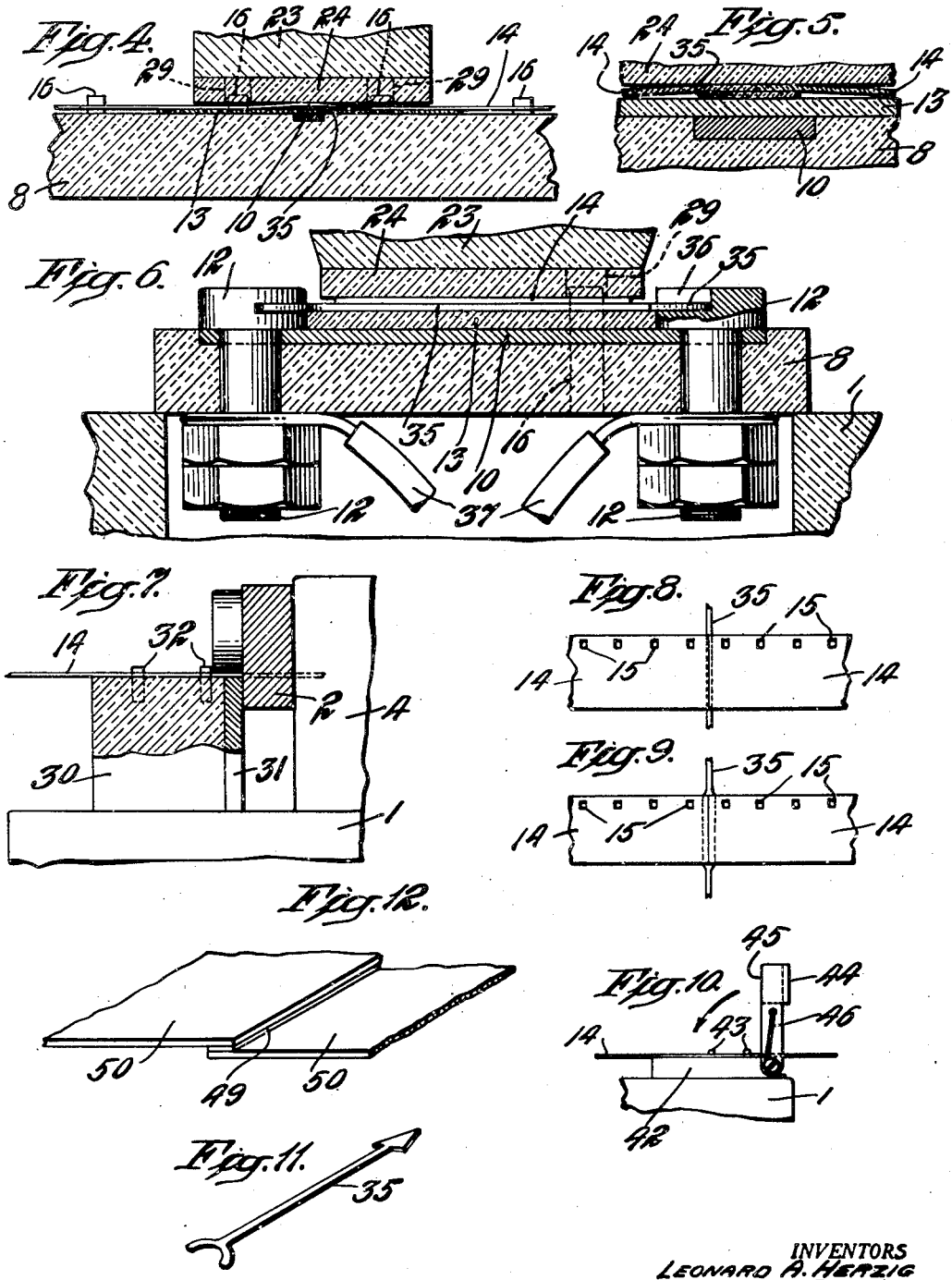

Patented Apr. 26, 1949

2,468,629

UNITED STATES PATENT OFFICE 2,468,629

METHOD AND APPARATUS FOR SPLICING FILMS

Leonard A. Herzig and Martin Coan, Jackson Heights, N. Y., assignors of forty-seven and one-half per cent to Leonard A. Herzig and Martin Coan, as trustees, and five per cent to Henry S. Hendricks, Mamaroneck, N. Y.

Application November 14, 1945, Serial No. 628,568

11 Claims. (Cl. 154—42.1)

This invention relates to splicing thermoplastic films, sheets or the like, and has for its object to provide a novel and improved method and apparatus for uniting such articles without the use of cements, solvents or similar adhesive agents.

Another object of the invention is to provide a simple and efficient method and apparatus for joining films or sheets of the above type in a minimum length of time and with a bond which is smooth and pliable and as strong as the material bonded thereby.

Another object is to provide a splicing apparatus of the foregoing type, having novel and improved details of construction and features of operation.

Various other objects and advantages will be apparent as the nature of the invention is more fully disclosed.

For purposes of illustration the invention will be described in its application to the joining of strips of film containing either pictures or sound tracks, or both, although it will be evident as the description progresses that the method and apparatus disclosed herein are equally applicable to the splicing of other types and shapes of film-like materials.

In joining strips of coated thermoplastic film, such as motion picture or sound film, we prefer to make a butt joint since overlapping of the edges is undesirable especially in the case of films containing sound tracks; and, furthermore, an overlapping joint requires scraping the emulsion off one of the edges, which a butt joint avoids. Having arranged the two strips of film end to end, we preferably cover the uncoated abutting end portions of said strips with a thermoplastic bonding material, and then, while exerting uniform pressure on the end portions thus covered, we heat a limited area of said covered end portions to a bonding temperature which diminishes gradually from said limited area of heat application. As a result, the bonding material is softened and bonded to the abutting end portions of the strips in a smooth pliable joint which is as strong as the film itself.

It is known in the plastic arts that a successful molding operation requires rapid heating and rapid cooling. Previous attempts to weld thermoplastic films having included the use of water and air blasts to achieve rapid cooling. According to our invention, we confine the strips of film and the bonding material to be joined between special pressure surfaces, preferably mica, which are poor conductors of heat, and we apply heat to one or both of these pressure surfaces, thus insuring low heat retention and consequent rapid cooling. Most important, however, is the fact that during the splicing cycle the distribution of heat over the said pressure surfaces is gradual and tapering, diminishing gradually from the point of heat application, thus eliminating sharp differences of temperature at adjacent points along the film surface. This blending action prevents brittleness and edge effect in the joint, the surplus bonding material tending to flow toward the edges of the film where it may be trimmed off.

The material which we prefer to use for accomplishing the above-mentioned temperature gradient is mica which, in addition, presents a smooth polished surface and furthermore acts as an electrical insulator, facilitating the use of an electrical heating element for heating purposes as hereinafter described. Various ceramic and other materials may be used instead of mica for the above purpose, provided they either inherently possess the desired heat gradient property, or else are specially shaped or compounded with other materials to produce the desired effect.

The apparatus disclosed herein for the purpose of illustrating our invention is intended particularly for joining strips of thermoplastic motion picture or sound film having longitudinal sprocket holes. The apparatus comprises a base and a cooperating cover which are adapted to be secured together under substantial pressure. Flat sheets of mica line the cooperating surfaces of the base and cover for securing the ends of the strips of film therebetween. A narrow linear quick-cooling electrical heating element, such as a Nichrome ribbon, is mounted between the base and its mica lining, and suitable means such as centering pins are provided on the base for aligning the edges of the strips of film with said heating element. The end portions of film to be joined are covered with a thermoplastic bonding material, preferably a narrow strip or sliver of a material containing a higher percentage of plasticizer than the film to be spliced, after which the cover is pressed down upon the base and current is applied to the electrical heating element to effect the splice, as hereinafter more fully described.

Although the novel features which are characteristic of this invention are set forth more in detail in the claims appended hereto, the nature and scope of the invention may be better understood by referring to the following description, taken in connection with the accompanying drawings forming a part thereof, in which a specific embodiment has been set forth for purposes of illustration.

In the drawings:

Fig. 1 is a plan view of a film splicing apparatus embodying the invention, showing same in operative position with the cover closed upon the base;

Fig. 2 is a similar view with the cover open;

Fig. 3 is a longitudinal section taken on line 3—3 of Fig. 1;

Fig. 4 is an enlarged transverse section taken on line 4—4 of Fig. 2, but with the cover in closed position;

Fig. 5 is a greatly enlarged detail of the section shown in Fig. 4;

Fig. 6 is an enlarged sectional view taken on line 6—6 of Fig. 2, but with the cover in closed position;

Fig. 7 is an enlarged section taken on line 7—7 of Fig. 1, showing the step of shearing the edge of the film preparatory to splicing;

Fig. 8 is a plan view showing the abutting strips of film and the bonding strip or sliver prior to the bonding operation;

Fig. 9 is a similar view taken after the completion of the bonding operation;

Fig. 10 is a detail view illustrating the step of trimming the surplus edges of the bonding strip after the completion of the splice;

Fig. 11 is a perspective view of the thermoplastic bonding strip or sliver; and

Fig. 12 is a perspective view illustrating an alternative overlapping type of splice.

In the following description certain specific terms are used for convenience in referring to the various details of the invention. These terms, however, are to be interpreted as broadly as the state of the art will permit.

The apparatus shown in the drawings comprises a base 1 and a cover member 2 in the form of a rectangular frame including a bolt 3 by means of which the cover member is pivoted on a bearing block 4 secured to the base 1, as shown in Figs. 1 and 3.

A retaining nut 5 is threaded on the end of bolt 3, and a coil spring 6 is compressed between said nut 5 and a washer 7 which bears against the adjacent side of cover member 2 and urges same against the bearing block 4, or toward the left as viewed in Figs. 1 and 2.

A base plate 8 of heat resisting insulating material is secured to the base 1 by screws 9, and a flat narrow linear electrical heating element 10 is embedded in the plate 8 and connected to terminal posts 12 in said plate, as best shown in Figs. 3 and 6.

The heating element 10 may be any suitable type of quick-cooling metal or alloy of small cross section incapable of storing up any sizeable amount of heat. A recommended heating element is a length of Nichrome ribbon (.004" x .060") of a length slightly greater than the width of the film to be spliced.

The upper surface of the heating element 10 preferably lies flush with the surface of the plate 8, and this portion of the plate is covered by a lining 13 of mica which completely covers the heating element 10.

The strips of film 14 which are to be spliced may be motion picture film such as standard 8 mm., 16 mm. or 35 mm. film having sprocket holes on both longitudinal edges thereof, or film employed solely for sound reproduction which may have sprocket holes on only one longitudinal edge.

In the embodiment illustrated, the film 14 is conventional cellulose acetate film having sprocket holes 15 along one edge, and, in order that the ends of the film to be spliced may be properly aligned with the linear heating element 10, the plate 8 contains a single row of centering pins 16 engageable with the sprocket holes 15, the innermost pins 16 extending upwardly through suitable holes in the mica lining 13. When the sprocket holes 15 are properly seated on the pins 16, the opposite longitudinal edges of the strips of film 14 may be held in place by spring clips 18 which are mounted on the base 1 and are slidable into clamping engagement with the strips of film, as illustrated in Figs. 1 and 2.

The cover member 2 carries a composite block 20 secured thereto by screws 21 and comprising a layer 22 of yieldable material such as rubber, a layer 23 of insulating material, and a flat lining 24 of mica, the block 20 being so positioned that the mica lining 24 thereof will lie directly over the mica lining 13 on base plate 8 when the cover member is closed upon the base as shown in Figs. 3 to 6.

When the cover member 2 is thus closed upon the base, it may be tightly clamped in closed position by means of a pressure arm 25 which is rotatably mounted on a post 26 carried by base 1 and is adapted to engage a cam surface 28 on the forward edge of cover member 2 to hold the cover on the base under considerable constant pressure. When the cover is closed upon the base in this manner, the centering pins 16 which project through the mica lining 13 on base plate 8 are received in clearance holes 29 in the mica lining 24 on the cover, as shown in Figs. 4 and 6.

In splicing two strips of film 14 according to the method illustrated in Figs. 1 to 6, it may be necessary to trim off the ends to be joined, in order either to eliminate unwanted portions of the film, or else merely to slice off torn or ragged edges. This may be accomplished by placing the film on the cutting block 30 which is mounted on the base 1 and has a straight cutting edge 31 parallel to the adjacent side of the cover member 2 and positioned for sliding contact with the latter when the cover member is closed down upon the base as shown in Fig. 1. The block 30 has centering pins 32 engageable with the sprocket holes in the edge of the film for positioning purposes, and when the cover member 2 is moved downwardly upon its pivot 3 the end of the film is severed cleanly between the cutting edge 31 of the block and the cooperating side edge of the cover member which is urged into resilient contact with said cutting edge by the coil spring 6.

In the embodiment illustrated, splicing is accomplished with the aid of a thin, narrow thermoplastic bonding strip or sliver 35 of the same base as the film 14, in this case cellulose acetate, but preferably containing from 10% to 30% more plasticizer than the film itself. This ratio is desirable to insure a lower temperature flow point in the bonding sliver, causing it to act as a flux for bonding the two ends of the film. The plasticizer may be triphenylphosphate, for example, since most motion picture and sound film of cellulose acetate stock contains this chemical as a plasticizer. The bonding sliver 35 also has the advantage of allowing the film 14 to retain its original thickness and strength at the line of bond, the excess material flowing out of the edge of the splice during the bonding operation.

The bonding strip or sliver 35 is seated on the mica lining 13 of base plate 8, directly over the heating element 10 and in linear alignment with said heating element. In order to insure proper centering the ends of the sliver 35 are preferably shaped for engagement with the heads of terminal posts 12. In the case of the arrow-shaped sliver 35 shown in Fig. 11, for example, the pointed end of the arrow may engage in a corresponding wedge-shaped notch 36 in one post 12 while the opposite curved end of the arrow may straddle the curved head of the other post 12, as shown in Figs. 2 and 6.

After the bonding sliver 35 is properly seated on the mica lining 13, the two strips of film 14 are placed end to end on said lining with the uncoated surfaces of the strips facing down and the ends of said strips abutting along a linear line of junction which lies directly on top of the linear portion of sliver 35 and is therefore aligned with the heating element 10, as shown in Figs. 2, 5 and 6. The cover member 2 is then closed and locked in pressure engagement with the base by the pressure arm 25, in which position the abutting strips of film 14, superimposed at their line of junction upon the bonding sliver 35, will be tightly sandwiched between the mica linings 13 and 24, as shown in Figs. 3 to 6.

The terminal posts 12 are connected through conductors 37, transformer 38 and switch 39 with any suitable source of energizing current, and a pilot lamp 40 is connected in the circuit, as shown in Fig. 2. If desired, a thermostatically controlled switch 41 or other suitable means of heat control may be employed to open the circuit after a desired interval. It is also to be understood that a heating element similar to the element 10 may be mounted in the cover member 2 for directly heating both sides of the splice, depending upon the material being spliced and the degree of heat required. If two heating elements are employed they may be connected either in series or in parallel.

During the splicing cycle the heat distribution over the mica linings 13 and 24 is gradual and tapering, being at a maximum in the narrow linear area directly over the heating element 10, which area encompasses the line of juncture of the strips of film being spliced. Outwardly of this narrow line the temperature diminishes gradually so that there are no sharp differences of temperature from point to point along the film surfaces. As a result, the bonding sliver 35 is molded and blended into the ends of the strips of film with a bond which is as strong and pliable as the film itself.

Throughout the splicing cycle the pressure arm 25, in conjunction with the yieldable pressure-distributing member 22 of cover 2 applies a constant pressure to the portions of the film being spliced, maintaining an equalized pressure while the heat is melting down the plastic materials in the splice. A minimum pressure of 200 lbs/sq. in. is desirable; and the higher the pressure applied, the less critical will be the time cycle, since it is the pressure which causes the exclusion of gases surrounding the splice.

Figs. 8 and 9 show the relative shapes of the bonding sliver 35 before and after the splicing operation. As shown in Fig. 9 the surplus bonding material accumulates at the edges of the film where it may be trimmed off, for example by placing the spliced portion of the film on a shearing block 42 having suitable film centering pins 43 and a pivoted finger piece 44 having spaced trimming blades 45 which trim the overflow material to the proper width of the film, as shown in Figs. 1, 2 and 10. A suitable spring 46 normally holds the finger piece 44 in raised position, as shown in Fig. 10.

Although we prefer to employ a butt joint of the type described for motion picture and sound films, our method and apparatus are equally applicable to the making of overlapping joints. As shown in Fig. 12, for example, a bonding strip or sliver 49 may be sandwiched between the overlapping ends of two strips or sheets of film 50 and a splice effected in the manner previously described.

Although a specific embodiment has been shown and described herein for purposes of illustration, it will be evident to those skilled in the art that the invention, both as to method and apparatus, is capable of various modifications and adaptations within the scope of the appended claims.

The invention claimed is:

1. Method of joining two bodies at least one of which is a thermoplastic material, which comprises arranging said bodies in contact with each other between two pressure surfaces which have poor heat conducting properties and at least one of which surfaces is mica, and heating that portion of said mica surface which is aligned with the contacting portions of said bodies to soften said thermoplastic material and bond same to the other of said bodies.

2. Method of joining strips of thermoplastic film which comprises arranging said strips in contact with each other between two pressure surfaces which have poor heat conducting properties and at least one of which surfaces is mica, and heating that portion of said mica surface which is aligned with the contacting portions of said strips to soften and bond same together.

3. Method of joining strips of thermoplastic film which comprises placing said strips end to end between a sheet of mica and another sheet of poor heat conducting material with the abutting edges of said strips spanned by a thermoplastic bonding material, and heating the portion of said mica sheet which is aligned with said bonding material to soften the latter and bond same to said strips of film.

4. Method of joining strips of thermoplastic film which comprises placing said strips end to end between sheets of mica with the abutting edges of said strips spanned by a thermoplastic bonding strip, and heating the portion of the mica sheet which overlies said bonding strip to soften the latter and bond same to said strips of film.

5. Method of joining strips of thermoplastic film which comprises placing said strips end to end between two flat sheets of mica with the abutting edges of said strips spanned by a narrow thermoplastic sliver, pressing said sheets of mica together and simultaneously heating that portion of the mica sheet which directly contacts said thermoplastic sliver to soften the latter and bond same to said strips of film.

6. Method of joining strips of thermoplastic film which comprises placing said strips end to end between two flat sheets of mica with the abutting edges of said strips spanned by a narrow thermoplastic sliver containing a higher percentage of plasticizer than the strips to be joined, pressing said sheets of mica together and simultaneously heating that portion of the mica sheet which directly contacts said thermoplastic sliver to soften the latter and bond same to said strips of film.

7. Method of joining strips of thermoplastic film which comprises placing said strips end to end between two flat sheets of mica with the abutting edges of said strips spanned by a narrow thermoplastic sliver containing a higher percentage of plasticizer than the strips to be joined, pressing said sheets of mica together and simultaneously applying heat in a concentrated line wider than said thermoplastic sliver to that portion of the mica sheet which directly contacts said sliver to soften the latter and bond same to said strips of film.

8. Apparatus for thermoplastically joining strips of thermoplastic film, comprising a base, a cover for said base, cooperating linings on said base and cover at least one of said linings being mica, having a heat conducting gradient which diminishes gradually from a point of heat application, and means for heating a limited area of said mica lining.

9. Apparatus for thermoplastically joining strips of thermoplastic film, comprising a base, a cover for said base, cooperating linings on said base and cover having poor heat conducting properties and at least one of said linings being mica having a heat conducting gradient which diminishes gradually from a point of heat application, a narrow linear heating element beneath said mica lining for heating a narrow linear area of said mica lining, and means for holding said base and cover under pressure.

10. Apparatus for thermoplastically joining strips of thermoplastic film, comprising a base, a cover for said base, sheets of mica lining the cooperating surfaces of said base and cover for securing strips of film therebetween, a narrow linear heating element between said base and the mica lining thereof for heating a narrow linear area of said lining, means on said base for aligning portions of strips of film with said heating element, and means for securing said cover on said base.

11. Apparatus for thermoplastically joining strips of thermoplastic film having longitudinal sprocket holes, comprising a base, a cover for said base, sheets of mica lining the cooperating surfaces of said base and cover for securing strips of film therebetween, a narrow linear quick-cooling electrical heating element between said base and the mica lining thereof for heating a narrow linear area of said lining, centering pins on said base engageable with the sprocket holes of strips of film to align portions of said strips with said heating element, and means for applying pressure to said cover to hold same in engagement with said base.

LEONARD A. HERZIG.
MARTIN COAN.

REFERENCES CITED

The following references are of record in the file of this patent:

UNITED STATES PATENTS

| Number | Name | Date |
|---|---|---|
| 1,026,456 | Rambaud | May 14, 1912 |
| 1,535,129 | Monacelli et al. | Apr. 28, 1925 |
| 2,289,618 | Young | July 14, 1942 |
| 2,301,664 | Eggert et al. | Nov. 10, 1942 |
| 2,367,725 | Lindh et al. | Jan. 23, 1945 |

FOREIGN PATENTS

| Number | Country | Date |
|---|---|---|
| 94,893 | Austria | Nov. 10, 1923 |